(12) United States Patent
Thomason et al.

(10) Patent No.: US 11,188,921 B2
(45) Date of Patent: Nov. 30, 2021

(54) PRE-TRIP COGNITIVE LEARNING RECOMMENDATION ENGINE

(71) Applicant: INTERNATIONAL BUSINESS MACHINES CORPORATION, Armonk, NY (US)

(72) Inventors: Lowell Thomason, Byron, MN (US); Timothy Harold Brandt, Elysian, MN (US); John Rud, Rochester, MN (US); Kenneth Trisko, Stewartville, MN (US); Ronald Stanley Wesely, Rochester, MN (US)

(73) Assignee: International Business Machines Corporation, Armonk, NY (US)

(*) Notice: Subject to any disclaimer, the term of this patent is extended or adjusted under 35 U.S.C. 154(b) by 107 days.

(21) Appl. No.: 16/836,976

(22) Filed: Apr. 1, 2020

(65) Prior Publication Data

US 2021/0312466 A1    Oct. 7, 2021

(51) Int. Cl.
*G06Q 20/42* (2012.01)
*H04L 29/08* (2006.01)
(Continued)

(52) U.S. Cl.
CPC .......... *G06Q 20/42* (2013.01); *G06Q 20/108* (2013.01); *H04L 67/306* (2013.01); *H04W 4/12* (2013.01)

(58) Field of Classification Search
CPC ....... G06Q 20/42; G06Q 20/108; H04W 4/12; H04L 67/306
See application file for complete search history.

(56) References Cited

U.S. PATENT DOCUMENTS 5,086,385 A    2/1992    Launey
7,124,087 B1   10/2006   Rodriguez
(Continued)

FOREIGN PATENT DOCUMENTS

WO    WO-2020247492 A1 * 12/2020 ............. G09B 19/04

OTHER PUBLICATIONS

Lewis, Michael, R.: How to Pay Bills During an Extended Absence, Apr. 20, 2019, pp. 1-9 (Year: 2019).*
(Continued)

*Primary Examiner* — Bijendra K Shrestha
(74) *Attorney, Agent, or Firm* — Tihon Poltavets

(57) ABSTRACT

A method includes receiving financial data for a plurality of categories associated with the user, where the plurality of categories includes financial institution obligations, financial tracking tools, and recurring and nonrecurring financial obligations. The method also includes analyzing financial data for each of the plurality of categories and generating an initial report with a first plurality of recommendations for the plurality of categories. The method also includes, responsive to determining a modification was received for the initial report, updating at least one recommendation from the first plurality of recommendations and a user profile for the user planning the absence. The method also generating a final report with a second plurality of recommendations based on the initial report with the first plurality of recommendations and the modification. The method also performing an action to address an unresolved financial obligation based on at least one recommendation from the second plurality of recommendation.

17 Claims, 6 Drawing Sheets

(51) Int. Cl.
*H04W 4/12* (2009.01)
*G06Q 20/10* (2012.01)

(56) References Cited

U.S. PATENT DOCUMENTS

| | | |
|---|---|---|
| 7,769,611 B1 | 8/2010 | Rodriguez |
| 2007/0143155 A1 | 6/2007 | Whitsett |
| 2013/0073325 A1 | 3/2013 | Ross |
| 2016/0307210 A1* | 10/2016 | Agarwal ........... G06F 16/24578 |
| 2017/0234562 A1 | 8/2017 | Ribbich |
| 2017/0323345 A1* | 11/2017 | Flowers ................. G06F 17/18 |
| 2018/0252589 A1 | 9/2018 | Fadell |

OTHER PUBLICATIONS

Davenport et al.: Artificial Intelligence for the Real World, Jan.-Feb. 2018, Harvard Business Review, pp. 1-21 (Year: 2018).*

Mell et al., "The NIST Definition of Cloud Computing", National Institute of Standards and Technology, Special Publication 800-145, Sep. 2011, pp. 1-7.

Quinnscape, "Home of Packing and Packing Pro Travel Packing List App", http://www.quinnscape.com/, printed Jan. 20, 2020, pp. 1-2.

* cited by examiner

PRE-TRIP COGNITIVE LEARNING RECOMMENDATION ENGINE

FIELD OF INVENTION

This disclosure relates generally to cognitive learning, and in particular to generating recommendations for pre-trip planning utilizing cognitive learning.

BACKGROUND OF THE INVENTION

Typically, individuals encounter various financial obligations throughout the year, where the financial obligations can be weekly, monthly, quarterly, and/or seasonally based. Though financial institutions and various service providers utilize payment reminders and automated payment systems, certain financial obligations are not resolvable via automated payment systems. Furthermore, payment reminders can be missed by an individual for instances of extended travel, short notice travel, and/or due to large quantity of notifications (e.g., emails) that the individual might receive, where certain financial obligation can be missed.

SUMMARY

Embodiments in accordance with the present invention disclose a method, computer program product and computer system for a pre-trip cognitive recommendation engine, the method, computer program product and computer system can responsive to detecting a trigger event for a user planning an absence, receive financial data for a plurality of categories associated with the user, wherein the plurality of categories include financial institution obligations, financial tracking tools, recurring financial obligations, and nonrecurring financial obligations. The method, computer program product and computer system can analyze the financial data for each of the plurality of categories. The method, computer program product and computer system can generate based on the analyzing, an initial report with a first plurality of recommendations for one or more categories from the plurality of categories. The method, computer program product and computer system can responsive to determining a modification was received for the initial report, update at least one recommendation from the first plurality of recommendations and a user profile for the user planning the absence. The method, computer program product and computer system can generate a final report with a second plurality of recommendations based on the initial report with the first plurality of recommendations and the modification. The method, computer program product and computer system can perform an action to address an unresolved financial obligation based on at least one recommendation from the second plurality of recommendation.

DETAILED DESCRIPTION

Figure 1:
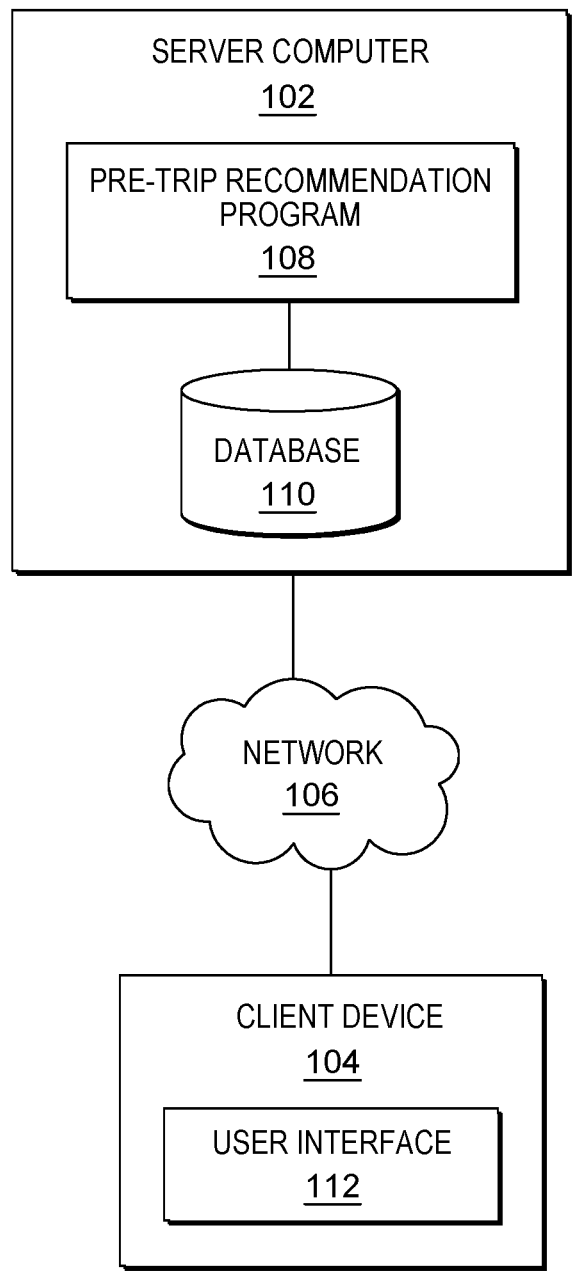
FIG. 1 is a functional block diagram illustrating a distributed data processing environment, in accordance with an embodiment of the present invention.

FIG. 1 is a functional block diagram illustrating a distributed data processing environment, in accordance with one embodiment of the present invention. The term "distributed" as used herein describes a computer system that includes multiple, physically distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims. The distributed data processing environment includes server computer 102 and client device 104, interconnected over network 106.

Server computer 102 can be a standalone computing device, a management server, a web server, a mobile computing device, or any other electronic device or computing system capable of receiving, sending, and processing data. In other embodiments, server computer 102 can represent a server computing system utilizing multiple computers as a server system, such as in a cloud computing environment. In another embodiment, server computer 102 can be a laptop computer, a tablet computer, a netbook computer, a personal computer (PC), a desktop computer, a personal digital assistant (PDA), a smart phone, or any programmable electronic device capable of communicating with client device 104 and other computing devices (not shown) within the distributed data processing environment via network 106. In another embodiment, server computer 102 represents a computing system utilizing clustered computers and components (e.g., database server computers, application server computers, etc.) that act as a single pool of seamless resources when accessed within distributed data processing environment 100. Server computer 102 includes pre-trip recommendation program 108 and database 110. Server computer 102 may include internal and external hardware components, as depicted and described in further detail with respect to FIG. 4.

Client device 104 can be a laptop computer, a tablet computer, a smart phone, smart watch, a smart speaker, or any programmable electronic device capable of communicating with various components and devices within the distributed data processing environment, via network 106. Client device 104 may be a wearable computer. Wearable computers are miniature electronic devices that may be worn by the bearer under, with, or on top of clothing, as well as in or connected to glasses, hats, or other accessories. Wearable computers are especially useful for applications that require more complex computational support than merely hardware coded logics. In general, client device 104 represents one or more programmable electronic devices or combination of programmable electronic devices capable of executing machine readable program instructions and communicating with other computing devices (not shown)

within the distributed data processing environment via a network, such as network 106. In one embodiment, client device 104 represents one or more devices associated with a user. Client device 104 includes an instance of user interface 112 for interacting with pre-trip recommendation program 108.

Network 106 can be, for example, a telecommunications network, a local area network (LAN), a wide area network (WAN), such as the Internet, or a combination of the three, and can include wired, wireless, or fiber optic connections. Network 106 can include one or more wired and/or wireless networks capable of receiving and transmitting data, voice, and/or video signals, including multimedia signals that include voice, data, and video information. In general, network 106 can be any combination of connections and protocols that will support communications between client server computer 102 and client device 104, and other computing devices (not shown) within the distributed data processing environment.

Pre-trip recommendation program 108 has the ability to receive profile information for a user (e.g., UserIDs, account numbers, email address) and data for each category associated with pre-trip recommendations, where the categories include various financial based obligations of the user (e.g., credit card, telephone) and financial tracking tools. Pre-trip recommendation program 108 analyzes the received data for each category and determines a recommendation for each category. Responsive to pre-trip recommendation program 108 determining a modification is received for at least one recommendation, pre-trip recommendation program 108 updates the recommendation based on the modifications. Furthermore, pre-trip recommendation program 108 updates profile information for the user based on the modification for future recommendations for the user, as part of the cognitive learning aspect of pre-trip recommendation program 108. Pre-trip recommendation program 108 can generate a report with the recommendations and perform an action based on the generated report. Pre-trip recommendation program 108 improves on present technology by processing and consolidating a large quantity of financial data for the user and utilizing cognitive learning to provide pre-trip recommendations to a user. Pre-trip recommendation program 108 also improves on present technology by providing a secondary form of fraud protection due to a trigger event initializing the process of generating an initial report with recommendations, where the trigger event can be an unauthorized purchase (i.e., potential fraudulent purchase).

Database 110 is a repository for data used by pre-trip recommendation program 108. In the depicted embodiment, database 110 resides on server computer 102. In another embodiment, database 110 may reside on another device (not illustrated in FIG. 1) within the distributed data processing environment provided message alert program 108 has access to database 110. Database 110 can be implemented with any type of storage device capable of storing data and configuration files that can be accessed and utilized by pre-trip recommendation program 108, such as a database server, a hard disk drive, or a flash memory. Database 110 stores data used by pre-trip recommendation program 108, such as user profiles, user preferences, account numbers, email address, previous recommendations, previous modifications to recommendation, and the like.

User interface 112 enables a user to make requests of or issue commands to client device 104 and receive information and instructions in response. In one embodiment, a user of client computing device 104 accesses user interface 112 via voice commands in natural language. In one embodiment, user interface 112 may be a graphical user interface (GUI) or a web user interface (WUI) and can display text, documents, web browser windows, user options, application interfaces, and instructions for operation, and include the information (such as graphic, text, and sound) that a program presents to a user and the control sequences the user employs to control the program. In another embodiment, user interface 112 may also be mobile application software. In an example, mobile application software, or an "app," is a computer program designed to run on smart phones, tablet computers and other mobile devices. User interface 112 enables a user of client computing device 104 to interact with pre-trip recommendation program 108.

Figure 2:
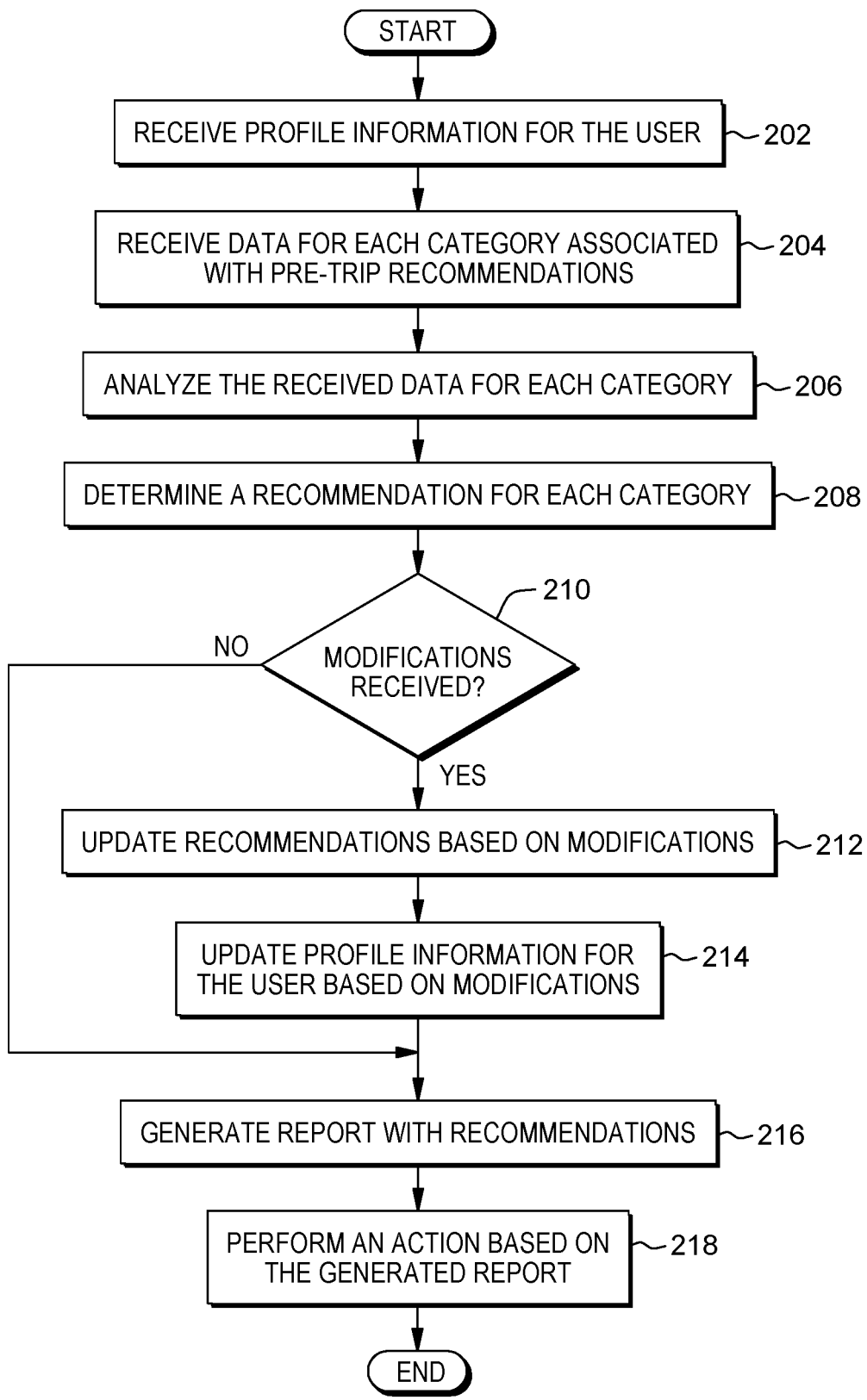
FIG. 2 is a flowchart depicting operational steps of a pre-trip recommendation program for generating pre-trip financial recommendations based on cognitive learning, in accordance with an embodiment of the present invention.

FIG. 2 is a flowchart depicting operational steps of a pre-trip recommendation program for generating pre-trip financial recommendations based on cognitive learning, in accordance with an embodiment of the present invention.

Pre-trip recommendation program 108 can detect a trigger event to initialize the process of generating recommendations for each category associated with a financial obligation (e.g., credit card account) or financial tracking tool. Examples of a trigger event include but are not limited to a calendar entry, a user input, a web-based interface, a credit card purchase, a telephone service purchase, and or any other event that signals an upcoming absence by the user. For a calendar entry, pre-trip recommendation program 108 can access a calendar associated with the user (e.g., email based) and identify instances where the user has entered a planned absence based on one or more calendar entries, one or more email communications (e.g., email from an airline company confirming a flight purchase), and/or out-of-office settings. For a user input, pre-trip recommendation program 108 can receive a user input via a user interface on a client device associated with the user specifying a planned absence. Based on the user input specifying the planned absence, pre-trip recommendation program 108 can initialize the process of generating recommendations.

For a web-based interface, pre-trip recommendation program 108 has the ability to monitor web browser activity of the user via a browser extension and identify instances where the user is planning an absence. For example, if the user visits a webpage of an airline company to search for flights, pre-trip recommendation program 108 can identify intended days of travel (i.e., round trip flight dates) and initialize the process of generating recommendations for a planned absence based on the intended days of travel. Furthermore, pre-trip recommendation program 108 has the ability to generate recommendations for a planned absence based on the intended days of travel and a specified time interval (e.g., 30 days) surrounding the intended days of travel, where a user can select the intended days of travel based on the recommendations that pre-trip recommendation program 108 generates. Pre-trip recommendation program 108 can utilize the specified time interval surrounding the intended days of travel to provide recommendations regarding finance obligations and/or financial tracking tools, where a user can alter the intended days of travel based on the recommendation to maximize any financial benefits for the financial obligations associated with the alteration of the intended days of travel.

For a credit card purchase, pre-trip recommendation program 108 has the ability to identify travel and/or absence related purchases and initialize the process of generating recommendations. Travel and/or absence related purchases can include but are not limited to travel ticket purchases, lodging bookings, travel insurance purchases, rental car bookings, out of area reservations (e.g., restaurants, museums). Furthermore, pre-trip recommendation program 108 can be utilized as an additional form of fraud protection, since pre-trip recommendation program 108 initializes the process of generating recommendations for travel and/or absence related purchases and notifies the user with one or more recommendations. However, if the user is not planning an absence and a first form of fraud protection (e.g., credit card) failed to catch the travel and/or absence related purchase, pre-trip recommendation program 108 notifies the users of the travel related purchases via the generated recommendations and the user can further investigate the purchase. For a telephone service purchase, pre-trip recommendation program 108 has the ability to identify travel related call, text, and/or data purchases and initialize the process of generating recommendations.

Pre-trip recommendation program 108 receives (202) profile information for the user. The profile information is user specific information that includes but is not limited to user identification (i.e., user ids) for each financial obligation and financial tracking tool, user passwords for each financial obligation and financial tracking tool, a list of financial obligations (web-based and non-web-based), user preferences, account numbers, account email addresses, previous recommendations, and previous modifications to recommendations. Previous recommendations and previous modifications to recommendations are utilized for the cognitive learning aspect of pre-trip recommendation program 108 to allow for user specific recommendations based on any identified patterns. Pre-trip recommendation program 108 can collect the profile information at a time when a user creates an initial profile, where the profile information is updatable based as one or more financial obligations are added or removed, along with any financial tracking tools which a user commences to utilize or ceases to utilize.

Pre-trip recommendation program 108 receives (204) data for each category associated with pre-trip recommendations. The categories associated with the pre-trip recommendation include financial institution obligations, financial tracking tools, alternative recurring financial obligations, and alternative nonrecurring financial obligations. Financial institution obligations include banking and credit card institutions, where the data for the financial institution obligations is gathered from previously generated financial statements. Pre-trip recommendation program 108 has the ability to access each account associated with a financial institution obligation utilizing received user profile information for the user and obtain one or more previously generated financial statement (e.g., monthly statements). Since the financial statements from financial institutions include a limited amount of personal information, pre-trip recommendation program 108 maintains the integrity of the personal information for the user. Financial tracking tools includes one or more computer implemented programs for manually tracking spending by the user, where the one or more computer implemented programs have the ability to pull financial data for the user and receive manually inputted financial data from the user. Pre-trip recommendation program 108 can utilizes a predetermined amount (e.g., 60 days) of pulled financial data and manually inputted financial data received from the user.

Alternative recurring financial obligations includes financial data representing one or more instances of financial obligations not capturable by the financial institution obligations or financial tracking tools. Alternative recurring financial obligations includes cable service payments, gas service payments, electric service payments, transportation payments (e.g., metro monthly passes, vehicle tool payments), insurance payments (e.g., vehicle, homeowner), entertainment service payments (e.g., internet based streaming content), snow removal payments, land scaping payments, and any other recurring payments not capturable by financial institutions or financial tracking tools. It is to be noted, recurring payments refers to payments recurring in set intervals that include weekly, bi-weekly, monthly, quarterly, seasonally, and yearly. For example, snow removal payments and land scaping payments represent seasonal alternative recurring financial obligations. Furthermore, seasonal alternative recurring financial obligations can vary year-to-year due to a variability in weather, which can dictate when snow removal or land scaping is required, if at all. Alternative nonrecurring financial obligations includes financial data representing one or more instances of financial obligations not capturable by the financial institution obligations or financial tracking tools, where financial obligation is considered a one-time purchase or expense.

Pre-trip recommendation program 108 analyzes (206) the received data for each category. Pre-trip recommendation program 108 analyzes the received financial data for each category by parsing through the received data and consolidating the received data by eliminating duplicate data. For example, financial data associated with financial institution obligations, alternative recurring financial obligations, and alternative nonrecurring financial obligations can also be present in the financial data associated with the financial tracking tools, where a certain financial obligation (e.g., credit card bill) is listed in multiple categories. Pre-trip recommendation program 108 can parse though the financial data in all categories and identify duplicate financial data based on a financial amount, a date of financial event, a description associated with the financial amount (e.g., payees), and/or metadata associated with each portion of the financial data. Subsequent to identifying the duplication financial data, pre-trip recommendation program 108 eliminates the duplicate financial data for positive matches and can query the user for confirmation on partial matches. An example of a partial match can include matching financial amounts and dates of the financial event, but varying descriptions associated with the financial amounts.

Subsequent to eliminating duplicate financial data, pre-trip recommendation program 108 determines financial patterns based on the financial amount, the date of financial event, the description associated with the financial amount (e.g., payees), and the metadata associated with each portion of the financial data. Pre-trip recommendation program 108 determines which portions of the financial data includes seasonal data, cycle data, and nonrecurring purchase data. Example of seasonal data includes snow removal payments (winter), landscaping payments (spring, summer, and fall), and utility (e.g., gas service, electric service) variational in spending. For utility variational spending, pre-trip recommendation program 108 can determine that gas service payments are higher (i.e., above a threshold financial amount) during the winter months compared to the spring, summer, and fall months and pre-trip recommendation program 108 can determine that electric service payments are higher (i.e., above a threshold financial amount) during the summer months compared to the winter, spring, and fall months. Pre-trip recommendation program 108 can utilize historical weather data (e.g., temperature and precipitation levels) to identify a correlation between previous seasonal financial data and the historical weather data, to predict future seasonal financial data based on a weather forecast for a period of time associated with an absence of the user.

Examples of cycle data includes items such as property tax payments (e.g., every 6 months), homeowner insurance payments (e.g., yearly), vehicle insurance payments (e.g., monthly), vehicle maintenance (e.g., average of 4.5 months), cellphone service payment (e.g., monthly), and any other recurring payments. Pre-trip recommendation program 108 identifies the various cycles for the financial data and utilizes the identified cycles to predict future cycle based financial obligations for a period of time associated with an absence of the user. Example of nonrecurring purchase data (i.e., non-cycle) includes a vehicle purchase, a residence purchase, a financial amount purchase (e.g., transmission replacement for vehicle, boiler replacement for residence) above a set threshold (e.g., $2500). Pre-trip recommendation program 108 utilizes the nonrecurring purchase data to establish a financial buffer for the user to ensure that the recommendation for each category includes an additional financial amount to cover any potential future nonrecurring purchases (e.g., new window replacement, plumbing repair).

Pre-trip recommendation program 108 determines (208) a recommendation for each category. In this embodiment, pre-trip recommendation program 108 determines a recommendation for each category including financial institution obligations, financial tracking tools, alternative recurring financial obligations, and alternative nonrecurring financial obligations. In other embodiments, pre-trip recommendation program 108 determines a recommendation for one or more of the categories. Pre-trip recommendation program 108 determines a recommendation for each category by generating an initial report for every identified financial obligation and furthermore, pre-trip recommendation program 108 can generate an initial report for every financial obligation for a period of time associated with an absence of the user. The initial report can list a payee (e.g., gas service provider), a financial amount (e.g., $123.45), a payment type for each financial obligation, and a description for the financial obligation. The payment type indicates whether the payment is performed automatically through an autopay feature or manually through an input by the user. The description for the financial obligation indicates whether the payment is nonrecurring or recurring in set intervals that include weekly, bi-weekly, monthly, quarterly, seasonally, and yearly. As previously discussed, pre-trip recommendation program 108 utilizes a threshold financial amount (e.g., $2500) to identify nonrecurring payments outside the bounds of normal spending habit for the user.

For financial institution obligations, pre-trip recommendation program 108 generates a recommendation that includes identifying and flagging financial obligations with due payments for the period of time associated with the absence of the user. In one example, pre-trip recommendation program 108 identifies credit card company A has a payment due date that falls within the period of time associated with the absence of the user, where credit card company A utilizes an autopay feature that deducts a balance from a checking account in bank account A. Since pre-trip recommendation program 108 received data for all financial institution obligations in (204), pre-trip recommendation program 108 determines that a balance for the checking account in bank account A is not enough to cover the balance due and pre-trip recommendation program 108 provides a recommendation to the user to transfer money from a savings account in bank account A or another bank account B to the checking account in bank account A. In another example, pre-trip recommendation program 108 can recommend that the user monitor an email account associated with credit card company A to ensure a payment confirmation is received for the autopay feature and payment of the due balance.

For financial tracking tools, pre-trip recommendation program 108 generates a recommendation that includes one or more performable actions to improve a financial status of the user for the period of time associated with the absence of the user. In one example, pre-trip recommendation program 108 determines that the user is traveling abroad for a period of time based on the financial data received in (204) and provides a recommendation to the user to utilize a specific credit card to minimize international purchase fees while traveling abroad. In another example, pre-trip recommendation program 108 determines that the user is traveling abroad for a period of time based on the financial data received in (204) and provides a recommendation to create a sub-category in a financial tracking tool to track purchases for the period of time associated with the absence of the user. Pre-trip recommendation program 108 can utilize the sub-category in the financial tracking tool for self-learning to provide subsequent recommendations to the user for furfure planned absences based on expenses of the user during previous absences.

For alternative recurring financial obligations, pre-trip recommendation program 108 generates a recommendation that includes identifying and flagging financial obligations with due payments for the period of time associated with the absence of the user. In one example, pre-trip recommendation program 108 identifies electric company A has a payment due date that falls within the period of time associated with the absence of the user, where the user does not utilize an autopay feature that deducts a balance from a checking account to pay a balance. Pre-trip recommendation program 108 provides a recommendation to the user to pay the balance prior to a start data of the period of time associated with the absence of the user. In another example, pre-trip recommendation program 108 identifies landscaping company A has a payment due date that falls within in a predetermined amount of days (e.g., 14 days) surrounding the period of time associated with the absence of the user and provides a recommendation to the user regarding the possible due payment. Pre-trip recommendation program 108 identifies a financial obligation for landscaping company A as associated with a seasonal cycle and based on the financial data received in (204), pre-trip recommendation program 108 determines that the payment due to landscaping company A falls within the predetermined amount of days surrounding the period of time associated with the absence of the user. Therefore, pre-trip recommendation program 108 provides a recommendation to the user regarding the possible payment to landscaping company A.

For alternative nonrecurring financial obligations, pre-trip recommendation program 108 generates a recommendation that includes identifying and flagging financial obligations with due payments for the period of time associated with the absence of the user. In one example, pre-trip recommendation program 108 identifies one or more previous periods of time associated with an absence of the user and identifies one or more financial obligations that are nonrecurring (e.g., resort payment, rental car payment) to determine an amount of funds spent during the one or more precious periods of time associated with the absence of the user. Based on the determination, pre-trip recommendation program 108 provides a recommendation to the user to transfer funds from a savings account in bank account A and/or another bank account B to a checking account in bank account A, to anticipate any influx in spending during the period of time associated with the absence of the user.

Pre-trip recommendation program 108 determines (decision 210) whether a modification was received for at least one recommendation. In the event pre-trip recommendation program 108 determines a modification was received for at least one recommendation ("yes" branch, decision 210), pre-trip recommendation program 108 updates (212) the recommendations based on the modifications. In the event pre-trip recommendation program 108 determines a modification was not received for at least one recommendation ("no" branch, decision 210), pre-trip recommendation program 108 generates (216) a report with the recommendations.

Pre-trip recommendation program 108 determines whether a modification was received for at least one recommendation by generating user feedback questions and utilizing the responses from the user to determine if a modification was received from the user and if updates are required for the recommendations based on the modifications. Examples of user feedback questions include but are not limited to, 'Are the payees correct?', 'Are all payment amounts correct?', 'Are all payment types correct?', 'Are any payees missing?', 'Are any payment amounts missing?', 'Are any payment types missing?', 'Hide any payee?'. 'Hide autopay payment types?', and 'Hide nonrecurring payment types?'. Pre-trip recommendation program 108 utilizes this user feedback loop with every initial set of recommendations to modify the initial set of recommendation to generate a report for the user. Furthermore, pre-trip recommendation program 108 utilizes previous user feedback loops for future recommendations and future generated reports for the user.

Pre-trip recommendation program 108 updates (212) the recommendations based on the modifications. In one example, pre-trip recommendation program 108 presented the user feedback question, "Are any payees missing?" to the user, where the user responded, "Yes, missing a $300 payment to the dentist." Pre-trip recommendation program 108 utilizes natural language processing to determine the payee as "dentist' and the payment amount as "$300". Based on the modification received from the user, pre-trip recommendation program 108 can determined if the recommendation requires updating based on the modification. In another example, pre-trip recommendation program 108 presented the user with the feedback question, "Hide any payee?" to the user, where the user responded, "Yes, hide landscaping payment." Pre-trip recommendation program 108 utilizes natural language processing to determine a particular payee as "landscaping company" and removes any recommendation associated with that particular payee. Pre-trip recommendation program 108 utilizes cognitive learning through the user feedback and updates the initial report with recommendations accordingly. The algorithm for pre-trip recommendation program 108 adjusts to account for addition, deletions, and corrections to the initial report with recommendations and any financial obligation patterns identified with each initial report with recommendations.

Pre-trip recommendation program 108 updates (214) profile information for the user based on the modifications. Pre-trip recommendation program 108 updates the profile information for the user based on the modifications as part of the cognitive learning aspect, where pre-trip recommendation program 108 utilizes the updated to the profile information to tailor future generated reports and recommendations according to each user. As previously discussed, previous recommendations and previous modifications to recommendations are utilized for the cognitive learning aspect of pre-trip recommendation program 108 to allow for user specific recommendations based on any identified patterns. Pre-trip recommendation program 108 updates the profile information based as one or more financial obligations being added or removed, along with any financial tracking tools which a user commences to utilize or ceases to utilize.

Pre-trip recommendation program 108 generates (216) a report with the recommendations. Pre-trip recommendation program 108 generates a final report based on the initial report with recommendations, modifications received by the user, and the updated recommendations based on the modifications. The final generated report includes a recommendation for one or more categories that includes financial institution obligations, financial tracking tools, alternative recurring financial obligations, and alternative nonrecurring financial obligations. Pre-trip recommendation program 108 determines a recommendation for each category by generating a final report for every financial obligation for a period of time associated with an absence of the user. The final generated report can list a payee (e.g., gas service provider), a financial amount (e.g., $123.45), a payment type for each financial obligation, and a description for the financial obligation. The payment type indicates whether the payment is performed automatically through an autopay feature or manually through an input by the user. The description for the financial obligation indicates whether the payment is nonrecurring or recurring in set intervals that include weekly, bi-weekly, monthly, quarterly, seasonally, and yearly. Additionally, based on the recommendation, pre-trip recommendation program 108 provides a user interface selectable option for taking action for one or more unresolved financial obligations (i.e., requiring payment). Alternatively, based on user profile settings, pre-trip recommendation program 108 can automatically perform the action for the one or more unresolved financial obligations.

Pre-trip recommendation program 108 performs (218) an action based on the generated report. As previously discussed, pre-trip recommendation program 108 can perform the action for the one or more unresolved financial obligations automatically without user input or responsive to a user input. In one embodiment, pre-trip recommendation program 108 generated a final report that listed a payee (e.g., landscape company) that required payment which is due during a period of time associated with an absence of the user, where pre-trip recommendation program 108 previously determined that the payee does accept payment through autopay function. In one example, pre-trip recommendation program 108 performs an action to address the unresolved financial obligation by accessing a mobile payment service for the user based on the user profile and populating payee information in a first designated portion of the user interface and populating an amount for payment due to the payee in a second designation portion of the user interface. The user can subsequently review the information populated by pre-trip recommendation program 108 and authorize the payment utilizing the mobile payment service. In another example, pre-trip recommendation program 108 performs an action to address the unresolved financial obligation by generating an electronic message that includes a period of time associated with an absence of the user and a note specifying that a payment remains unresolved, where pre-trip recommendation program 108 sends the generated electronic message to the payee responsive to receive user input (i.e., confirmation). The generated email allows for the payee to generate and respond with an invoice and/or alter a payment due date outside of the time period associated with the absence of the user, to resolve the financial obligation.

In another embodiment, pre-trip recommendation program 108 generated a final report that listed a payee (e.g., credit card company A) that required payment which is due during a period of time associated with an absence of the user, where pre-trip recommendation program 108 previously determined a scheduled payment through an autopay function is going to draw from a checking account in a bank account that has insufficient financial funds to cover the payment. In one example, pre-trip recommendation program 108 performs an action to address the unresolved financial obligation by accessing a user interface for a bank service associated with the bank account for the user based on the user profile and responsive to determining a savings account includes the sufficient financial funds, initiating a transfer of funds between the checking account and the savings account for the bank account. In another example, pre-trip recommendation program 108 accesses the bank account for the user based on the user profile and responsive to determining a savings account does not include sufficient financial funds, accessing another bank account for the user based on the user profile. Responsive to pre-trip recommendation program 108 determining the other bank account includes sufficient financial funds, initiating a transfer of funds between the two bank accounts. For each instance of pre-trip recommendation program 108 transferring funds between accounts, pre-trip recommendation program 108 notifies the user of the transfer via an electronic message (e.g., text message, email).

Figure 3:
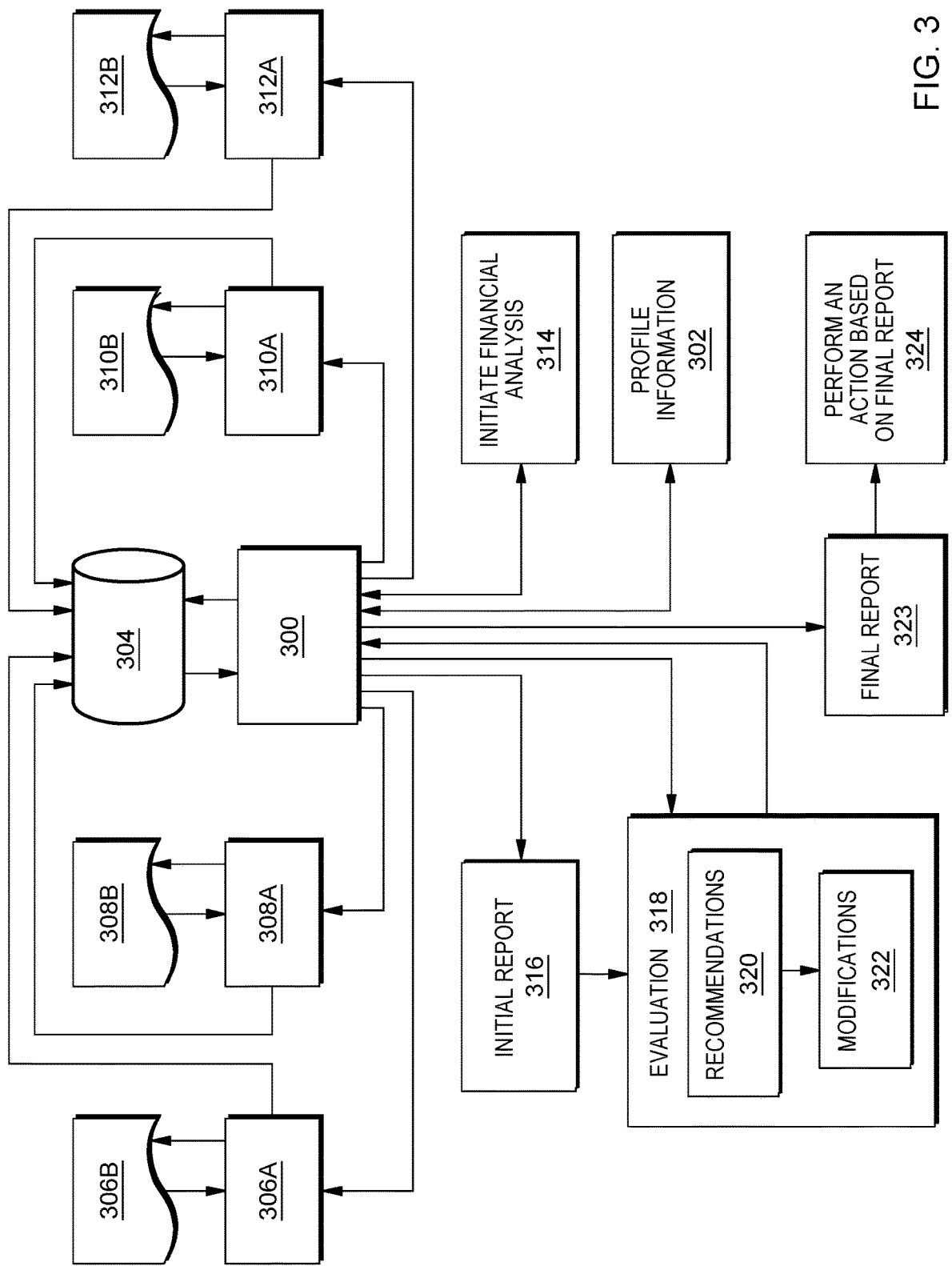
FIG. 3 is a process flow for a pre-trip recommendation program utilizing multiple data sources to perform the generating of pre-trip financial recommendations based on cognitive learning, in accordance with an embodiment of the present invention.

FIG. 3 is a process flow for a pre-trip recommendation program utilizing multiple data sources to perform the generating of pre-trip financial recommendations based on cognitive learning, in accordance with an embodiment of the present invention.

As previously discussed, pre-trip recommendation program 108 utilizes cognitive learning and computing to analyze financial data, generate initial reports with recommendations, generate a feedback loop utilizing natural language processing, generate a final report with recommendations based on modifications identified in the feedback loop, and performing an action based on the final report with recommendations. An expanded view of information flow of pre-trip recommendation program 108 is illustrated in FIG. 3, where pre-trip recommendation program 108 utilizes centralized data processor 300. Centralized data processor 300 receives profile information 302 for a user planning an absence for a set period of time. Centralized data processor 300 receives previously generated reports with recommendations and any previous modifications to recommendations received from the user from database 304. For each of the multiple categories including financial institution obligations 306A, financial tracking tools 308A, alternative recurring financial obligations 310A, and alternative nonrecurring financial obligations 312A, centralized data processor 300 receives financial data 306B, 308B, 310B, and 312B, respectively. Centralized data processor 300 initiates financial analysis 314 of financial data 306B, 308B, 310B, and 312B and generates initial report 316, where initial report 316 includes a consolidation of financial data 306B, 308B, 310B, and 312B (e.g., elimination of duplicate financial data). Subsequent to receiving at least one modification from the user, centralized data processor 300 performs evaluation 318 based on an initial set of recommendations 320 and any modifications 322 received from the user, where evaluation 318 includes updating initial report 316. Subsequently, centralized data processor 300 generates final report 323 based on initial report 316 and evaluation 318 of recommendations 320 and modifications 322. Final report 323 includes one or more performable the action for one or more unresolved financial obligations for the period of time the user is planning an absence. Based on final report 323, centralized data processor 300 can perform (324) an action based on the final report 323.

Figure 4:
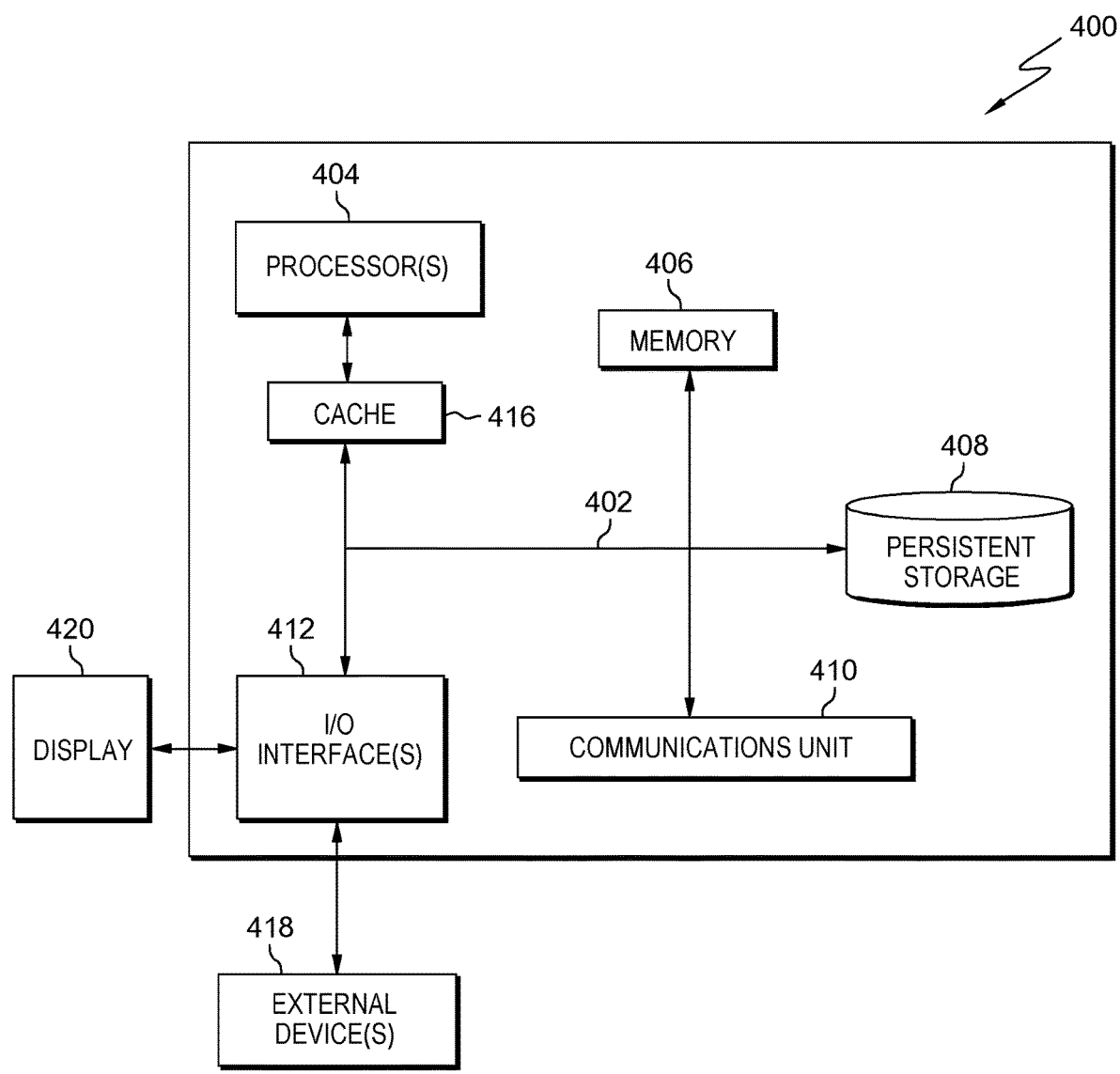
FIG. 4 is a block diagram of components of a computer system, such as the server computer of FIG. 1, in accordance with an embodiment of the present invention.

FIG. 4 depicts computer system 400, where server computer 102 is an example of a computer system 400 that includes pre-trip recommendation program 108. The computer system includes processors 404, cache 416, memory 406, persistent storage 408, communications unit 410, input/output (I/O) interface(s) 412 and communications fabric 402. Communications fabric 402 provides communications between cache 416, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses or a crossbar switch.

Memory 406 and persistent storage 408 are computer readable storage media. In this embodiment, memory 406 includes random access memory (RAM). In general, memory 406 can include any suitable volatile or non-volatile computer readable storage media. Cache 416 is a fast memory that enhances the performance of processors 404 by holding recently accessed data, and data near recently accessed data, from memory 406.

Program instructions and data used to practice embodiments of the present invention may be stored in persistent storage 408 and in memory 406 for execution by one or more of the respective processors 404 via cache 416. In an embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices. In these examples, communications unit 410 includes one or more network interface cards. Communications unit 410 may provide communications through the use of either or both physical and wireless communications links. Program instructions and data used to practice embodiments of the present invention may be downloaded to persistent storage 408 through communications unit 410.

I/O interface(s) 412 allows for input and output of data with other devices that may be connected to each computer system. For example, I/O interface 412 may provide a connection to external devices 418 such as a keyboard, keypad, a touch screen, and/or some other suitable input device. External devices 418 can also include portable computer readable storage media such as, for example, thumb drives, portable optical or magnetic disks, and memory cards. Software and data used to practice embodiments of the present invention can be stored on such portable computer readable storage media and can be loaded onto persistent storage 408 via I/O interface(s) 412. I/O interface(s) 412 also connect to display 420.

Display 420 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
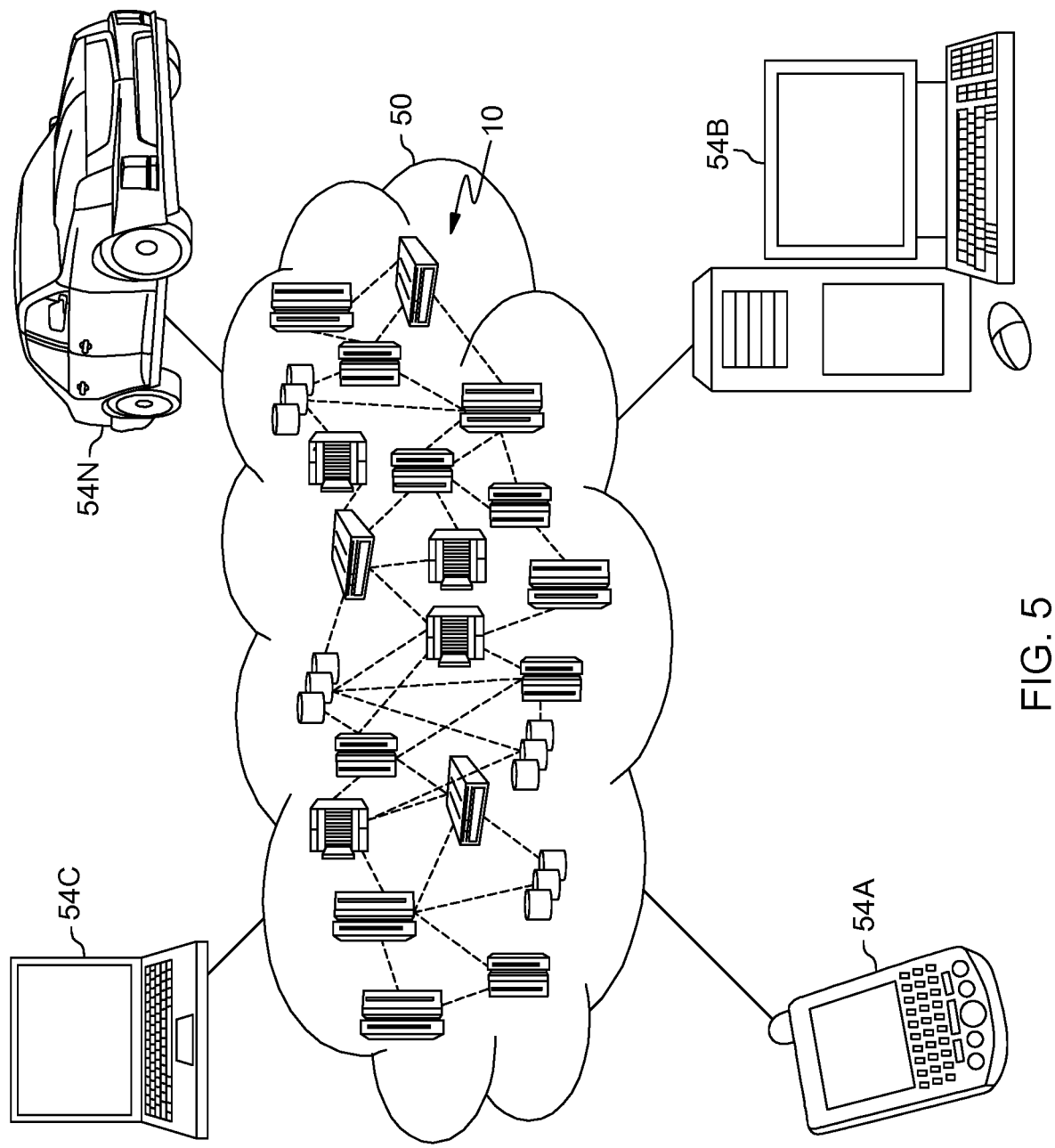
FIG. 5 depicts a cloud computing environment, in accordance with an embodiment of the present invention.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
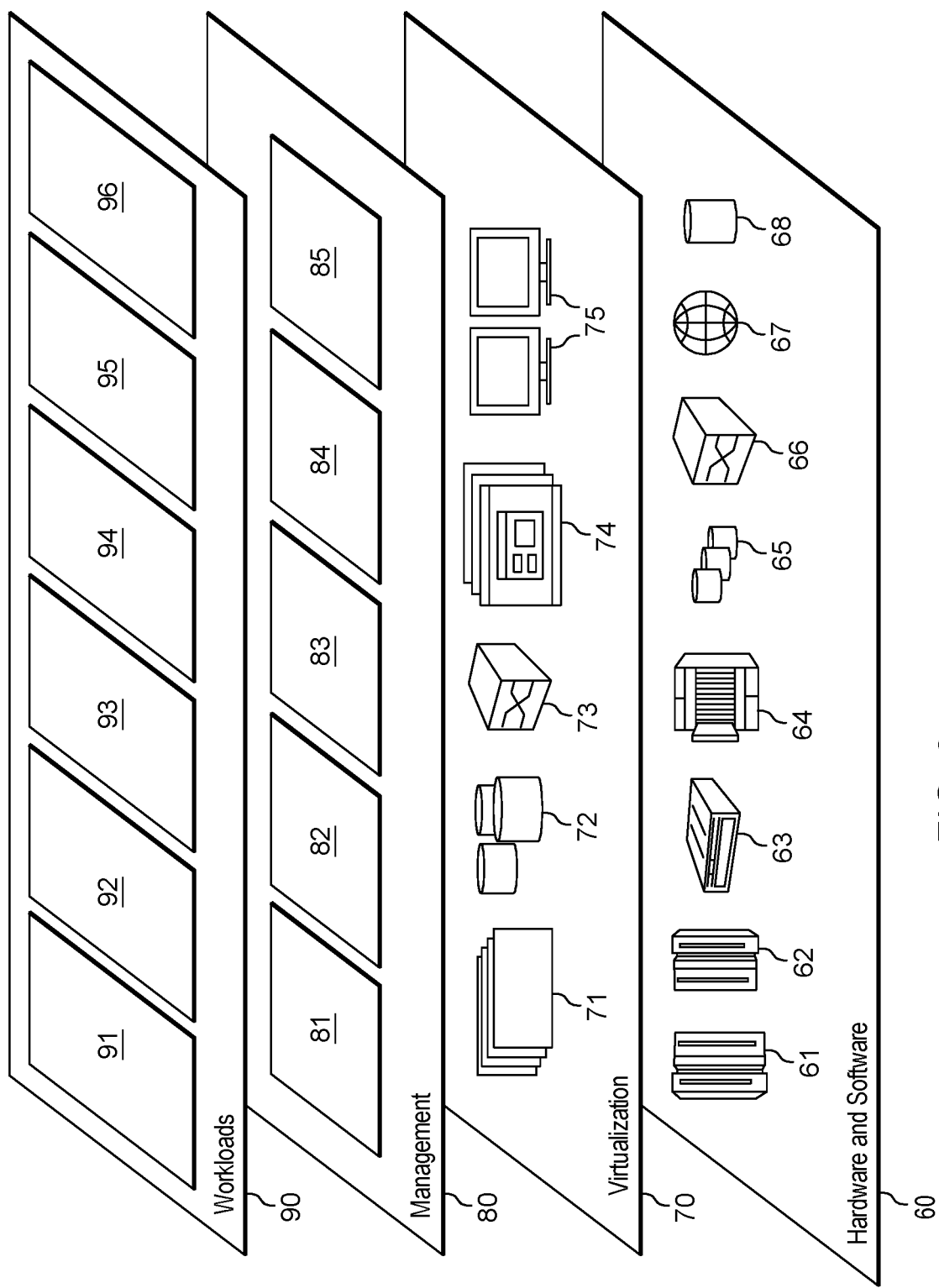
FIG. 6 depicts abstraction model layers, in accordance with an embodiment of the present invention.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 include hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and pre-trip recommendation program 108.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:
responsive to detecting a trigger event for a user planning an absence, receiving, by one or more processors, financial data for a plurality of categories associated with the user, wherein the plurality of categories include financial institution obligations, financial tracking tools, recurring financial obligations, and nonrecurring financial obligations;
analyzing, by one or more processors, the financial data for each of the plurality of categories;
generating, by one or more processors, based on the analyzing, an initial report with a first plurality of recommendations for one or more categories from the plurality of categories;
presenting, by one or more processors, via user interface, at least one feedback question to the user planning the absence based on the initial report with the first plurality of recommendations;
responsive to receiving a response to the at least one feedback question, determining, by one or more processors, whether the modification was received for the initial report based on the response for the at least one feedback question;
responsive to determining a modification was received for the initial report, updating, by one or more processors, at least one recommendation from the first plurality of recommendations and a user profile for the user planning the absence;
generating, by one or more processors, a final report with a second plurality of recommendations based on the initial report with the first plurality of recommendations and the modification; and
automatically performing, by one or more processors, an action addressing an unresolved financial obligation based on at least one recommendation from the second plurality of recommendation.

2. The method of claim 1, wherein analyzing the financial data for each of the plurality of categories further comprises:
consolidating, by one or more processors, a portion of the financial data representing duplicate data across the plurality of categories, wherein the consolidating is based on a financial obligation amount, a date of financial obligation event, a description associated with the financial obligation amount, and metadata associated with each entry of the financial data.

3. The method of claim 2, wherein analyzing the financial data for each of the plurality of categories further comprises:
determining, by one or more processors, a plurality of financial patterns based on one or more of: the financial obligation amount, the date of financial obligation event, the description associated with the financial obligation amount, and the metadata associated with each entry of the financial data.

4. The method of claim 1, wherein updating the user profile for the user planning absence is based on the modification received for the initial report, the initial report, and the first plurality of recommendations.

5. The method of claim 1, wherein performing the action to address the unresolved financial obligation further comprises:
accessing, by one or more processors, via a user interface, a mobile payment service for the user planning the absence based on the user profile; and
populating, by one or more processors, payee information associated with the unresolved financial obligation in a first designation portion of the user interface and a financial obligation amount due to a payee in a second designation portion of the user interface.

6. The method of claim 1, wherein performing the action to address the unresolved financial obligation further comprises:
responsive to determining a checking account of a bank account associated with the user planning the absence includes insufficient financial funds for the unresolved financial obligation, accessing, by one or more processors, via a user interface, the bank account for the user planning the absence based on the user profile; and
responsive to determining an amount in a checking account of the bank account includes sufficient financial funds for the unresolved financial obligation, initiating, by one or more processing, a transfer of funds between the savings account and the checking account of the bank account to address the unresolved financial obligation.

7. A computer program product comprising:
one or more non-transitory computer readable storage media and program instructions stored on at least one of the one or more storage media, the program instructions comprising:
program instructions to, responsive to detecting a trigger event for a user planning an absence, receive financial data for a plurality of categories associated with the user, wherein the plurality of categories include financial institution obligations, financial tracking tools, recurring financial obligations, and nonrecurring financial obligations;
program instruction to analyze the financial data for each of the plurality of categories;
program instructions to generate, based on the analyzing, an initial report with a first plurality of recommendations for one or more categories from the plurality of categories;
program instruction to present via user interface, at least one feedback question to the user planning the absence based on the initial report with the first plurality of recommendations; and
program instruction to, responsive to receiving a response to the at least one feedback question, determine whether the modification was received for the initial report based on the response for the at least one feedback question;
program instruction to, responsive to determining a modification was received for the initial report, update at least one recommendation from the first plurality of recommendations and a user profile for the user planning the absence;
program instructions to generate a final report with a second plurality of recommendations based on the initial report with the first plurality of recommendations and the modification; and
program instructions to automatically perform an action addressing an unresolved financial obligation based on at least one recommendation from the second plurality of recommendation.

8. The computer program product of claim 7, wherein analyzing the financial data for each of the plurality of categories further comprises program instructions, stored on the one or more computer readable storage media, which when executed by a processor, cause the processor to:
consolidate a portion of the financial data representing duplicate data across the plurality of categories, wherein the consolidating is based on a financial obligation amount, a date of financial obligation event, a description associated with the financial obligation amount, and metadata associated with each entry of the financial data.

9. The computer program product of claim 8, wherein analyzing the financial data for each of the plurality of categories further comprises program instructions, stored on the one or more computer readable storage media, which when executed by a processor, cause the processor to:
determine a plurality of financial patterns based on one or more of: the financial obligation amount, the date of financial obligation event, the description associated with the financial obligation amount, and the metadata associated with each entry of the financial data.

10. The computer program product of claim 7, wherein updating the user profile for the user planning absence is based on the modification received for the initial report, the initial report, and the first plurality of recommendations.

11. The computer program product of claim 7, wherein performing the action to address the unresolved financial obligation further comprises program instructions, stored on the one or more computer readable storage media, which when executed by a processor, cause the processor to:
access via a user interface, a mobile payment service for the user planning the absence based on the user profile; and
populate payee information associated with the unresolved financial obligation in a first designation portion of the user interface and a financial obligation amount due to a payee in a second designation portion of the user interface.

12. The computer program product of claim 7, wherein performing the action to address the unresolved financial obligation further comprises program instructions, stored on the one or more computer readable storage media, which when executed by a processor, cause the processor to:
responsive to determining a checking account of a bank account associated with the user planning the absence includes insufficient financial funds for the unresolved financial obligation, access, via a user interface, the bank account for the user planning the absence based on the user profile; and
responsive to determining an amount in a checking account of the bank account includes sufficient financial funds for the unresolved financial obligation, initiate a transfer of funds between the savings account and the checking account of the bank account to address the unresolved financial obligation.

13. A computer system comprising:
one or more computer processors;
one or more non-transitory computer readable storage media; and
program instructions stored on the computer readable storage media for execution by at least one of the one or more computer processors, the program instructions comprising:
program instructions to, responsive to detecting a trigger event for a user planning an absence, receive financial data for a plurality of categories associated with the user, wherein the plurality of categories include financial institution obligations, financial tracking tools, recurring financial obligations, and nonrecurring financial obligations;
program instruction to analyze the financial data for each of the plurality of categories;
program instructions to generate, based on the analyzing, an initial report with a first plurality of recommendations for one or more categories from the plurality of categories;
program instructions to present via user interface, at least one feedback question to the user planning the absence based on the initial report with the first plurality of recommendations;
program instructions to, responsive to receiving a response to the at least one feedback question, determine whether the modification was received for the initial report based on the response for the at least one feedback question;
program instruction to, responsive to determining a modification was received for the initial report, update at least one recommendation from the first plurality of recommendations and a user profile for the user planning the absence;

program instructions to generate a final report with a second plurality of recommendations based on the initial report with the first plurality of recommendations and the modification; and program instructions to automatically perform an action addressing an unresolved financial obligation based on at least one recommendation from the second plurality of recommendation.

14. The computer system of claim 13, wherein analyzing the financial data for each of the plurality of categories further comprises program instructions, stored on the one or more computer readable storage media, which when executed by a processor, cause the processor to:

consolidate a portion of the financial data representing duplicate data across the plurality of categories, wherein the consolidating is based on a financial obligation amount, a date of financial obligation event, a description associated with the financial obligation amount, and metadata associated with each entry of the financial data.

15. The computer system of claim 14, wherein analyzing the financial data for each of the plurality of categories further comprises program instructions, stored on the one or more computer readable storage media, which when executed by a processor, cause the processor to:

determine a plurality of financial patterns based on one or more of: the financial obligation amount, the date of financial obligation event, the description associated with the financial obligation amount, and the metadata associated with each entry of the financial data.

16. The computer system of claim 13, wherein performing the action to address the unresolved financial obligation further comprises program instructions, stored on the one or more computer readable storage media, which when executed by a processor, cause the processor to:

access via a user interface, a mobile payment service for the user planning the absence based on the user profile; and populate payee information associated with the unresolved financial obligation in a first designation portion of the user interface and a financial obligation amount due to a payee in a second designation portion of the user interface.

17. The computer system of claim 13, wherein performing the action to address the unresolved financial obligation further comprises program instructions, stored on the one or more computer readable storage media, which when executed by a processor, cause the processor to:

responsive to determining a checking account of a bank account associated with the user planning the absence includes insufficient financial funds for the unresolved financial obligation, access, via a user interface, the bank account for the user planning the absence based on the user profile; and responsive to determining an amount in a checking account of the bank account includes sufficient financial funds for the unresolved financial obligation, initiate a transfer of funds between the savings account and the checking account of the bank account to address the unresolved financial obligation.

* * * * *